(12) United States Patent
Norwich

(10) Patent No.: US 11,879,532 B2
(45) Date of Patent: Jan. 23, 2024

(54) TORQUE CONVERTER WITH INTEGRATED HYDRODYNAMIC WASHER AND SEAL

(71) Applicant: Schaeffler Technologies AG & Co. KG, Herzogenaurach (DE)

(72) Inventor: Victor Norwich, Wooster, OH (US)

(73) Assignee: Schaeffler Technologies AG & Co. KG, Herzogenaurach (DE)

(*) Notice: Subject to any disclaimer, the term of this patent is extended or adjusted under 35 U.S.C. 154(b) by 231 days.

(21) Appl. No.: 17/498,917

(22) Filed: Oct. 12, 2021

(65) Prior Publication Data

US 2023/0109897 A1   Apr. 13, 2023

(51) Int. Cl.
| | |
|---|---|
| *F16H 45/02* | (2006.01) |
| *F16J 15/02* | (2006.01) |
| *F16H 45/00* | (2006.01) |
| *F16H 41/24* | (2006.01) |

(52) U.S. Cl.
CPC ....... *F16H 45/02* (2013.01); *F16H 2041/246* (2013.01); *F16H 2045/005* (2013.01); *F16H 2045/0215* (2013.01); *F16H 2045/0221* (2013.01); *F16J 15/021* (2013.01)

(58) Field of Classification Search
CPC ............. F16H 2045/0278; F16H 45/02; F16H 2041/246; F16J 15/3204
See application file for complete search history.

(56) References Cited

U.S. PATENT DOCUMENTS

| | | | |
|---|---|---|---|
| 2018/0128360 A1* | 5/2018 | Hess | F16C 35/077 |
| 2018/0172129 A1* | 6/2018 | Depraete | F16F 15/123 |
| 2020/0263774 A1 | 8/2020 | Angel et al. | |
| 2020/0292043 A1* | 9/2020 | Matsuoka | F16H 45/02 |
| 2020/0393029 A1* | 12/2020 | Nelson | F16H 45/02 |

* cited by examiner

*Primary Examiner* — Abiy Teka
(74) *Attorney, Agent, or Firm* — Volpe Koenig

(57) ABSTRACT

A torque converter, including: a cover arranged to receive torque; an impeller including an impeller shell connected to the cover and at least one impeller blade; a turbine in fluid communication with the impeller and including a turbine shell and at least one turbine blade; and a stator assembly. The stator assembly includes: a stator including at least one stator blade axially disposed between the turbine and the impeller; a one-way clutch including an outer race non-rotatably connected to the stator and an inner race arranged to non-rotatably connect to a stator shaft; and a combination washer and seal including a first portion axially disposed between the turbine shell and the stator and a second portion extending radially inwardly from the first portion and arranged to at least partially seal against the stator shaft.

20 Claims, 8 Drawing Sheets

US 11,879,532 B2

TORQUE CONVERTER WITH INTEGRATED HYDRODYNAMIC WASHER AND SEAL

TECHNICAL FIELD

The present disclosure relates to a stator assembly with an integrated hydrodynamic washer and seal, and a torque converter with a stator assembly including an integrated hydrodynamic washer and seal.

BACKGROUND

Known stator assemblies use separate components to implement thrust washer and seal functionality.

SUMMARY

According to aspects illustrated herein, there is provided a stator assembly for a torque converter, including: a stator including at least one stator blade; and a one-way clutch including an outer race non-rotatably connected to the stator, an inner race arranged to non-rotatably connect to a stator shaft, an intermediate element radially disposed between the outer race and the inner race and arranged to control relative rotation between the inner race and the outer race, and a combination washer and seal including a first portion arranged to be axially disposed between the stator and a turbine shell of the torque converter and a second portion extending radially inwardly from the first portion and arranged to at least partially seal against the stator shaft.

According to aspects illustrated herein, there is provided a torque converter, including: a cover arranged to receive torque; an impeller including an impeller shell connected to the cover and at least one impeller blade; a turbine in fluid communication with the impeller and including a turbine shell and at least one turbine blade; and a stator assembly. The stator assembly includes: a stator including at least one stator blade axially disposed between the turbine and the impeller; a one-way clutch including an outer race non-rotatably connected to the stator and an inner race arranged to non-rotatably connect to a stator shaft; and a combination washer and seal including a first portion axially disposed between the turbine shell and the stator and a second portion extending radially inwardly from the first portion and arranged to at least partially seal against the stator shaft.

According to aspects illustrated herein, there is provided a method of operating a torque converter including a cover, an impeller including an impeller shell connected to the cover and at least one impeller blade, a turbine in fluid communication with the impeller and including a turbine shell and at least one turbine blade, a stator non-rotatably connect to a stator shaft and including at least one stator blade axially disposed between the turbine and the impeller, and a combination washer and seal. The method includes: applying rotational torque to the cover; rotating, at a first speed, the impeller shell with the cover; rotating, with the impeller and a first pressurized fluid in the impeller, the turbine at a second speed less than the first speed; clamping a first portion of the combination washer and seal between the turbine shell and the stator; rotating the turbine shell with respect to the stator; sealing a second portion of the combination washer and seal against the stator shaft; flowing a second pressurized fluid between the stator shaft and an input shaft of a torque converter and into a chamber defined at least in part by the cover and the turbine shell; and blocking, with the second portion of the combination washer and seal, a flow the second pressurized fluid between the stator shaft and the combination washer and seal.

BRIEF DESCRIPTION OF THE DRAWINGS

Various embodiments are disclosed, by way of example only, with reference to the accompanying schematic drawings in which corresponding reference symbols indicate corresponding parts, in which.

DETAILED DESCRIPTION

At the outset, it should be appreciated that like drawing numbers on different drawing views identify identical, or functionally similar, structural elements of the disclosure. It is to be understood that the disclosure as claimed is not limited to the disclosed aspects.

Furthermore, it is understood that this disclosure is not limited to the particular methodology, materials and modifications described and as such may, of course, vary. It is also understood that the terminology used herein is for the purpose of describing particular aspects only, and is not intended to limit the scope of the present disclosure.

Unless defined otherwise, all technical and scientific terms used herein have the same meaning as commonly understood to one of ordinary skill in the art to which this disclosure belongs. It should be understood that any methods, devices, or materials similar or equivalent to those described herein can be used in the practice or testing of the disclosure.

Figure 1:
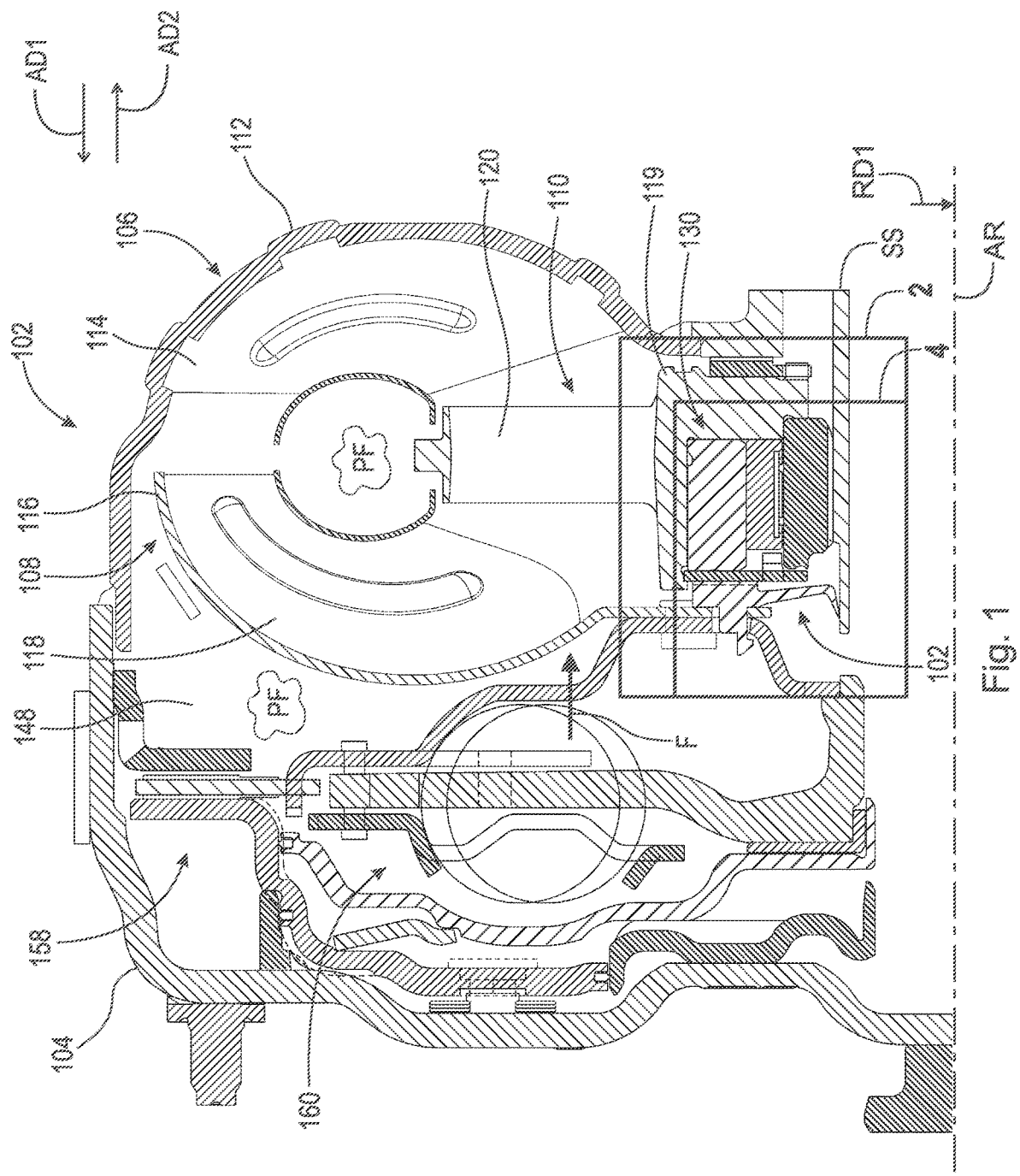
FIG. 1 is a partial cross-sectional view of a torque converter with a combination washer and seal.

FIG. 1 is a partial cross-sectional view of a torque converter with combination washer and seal 100.

Figure 2:
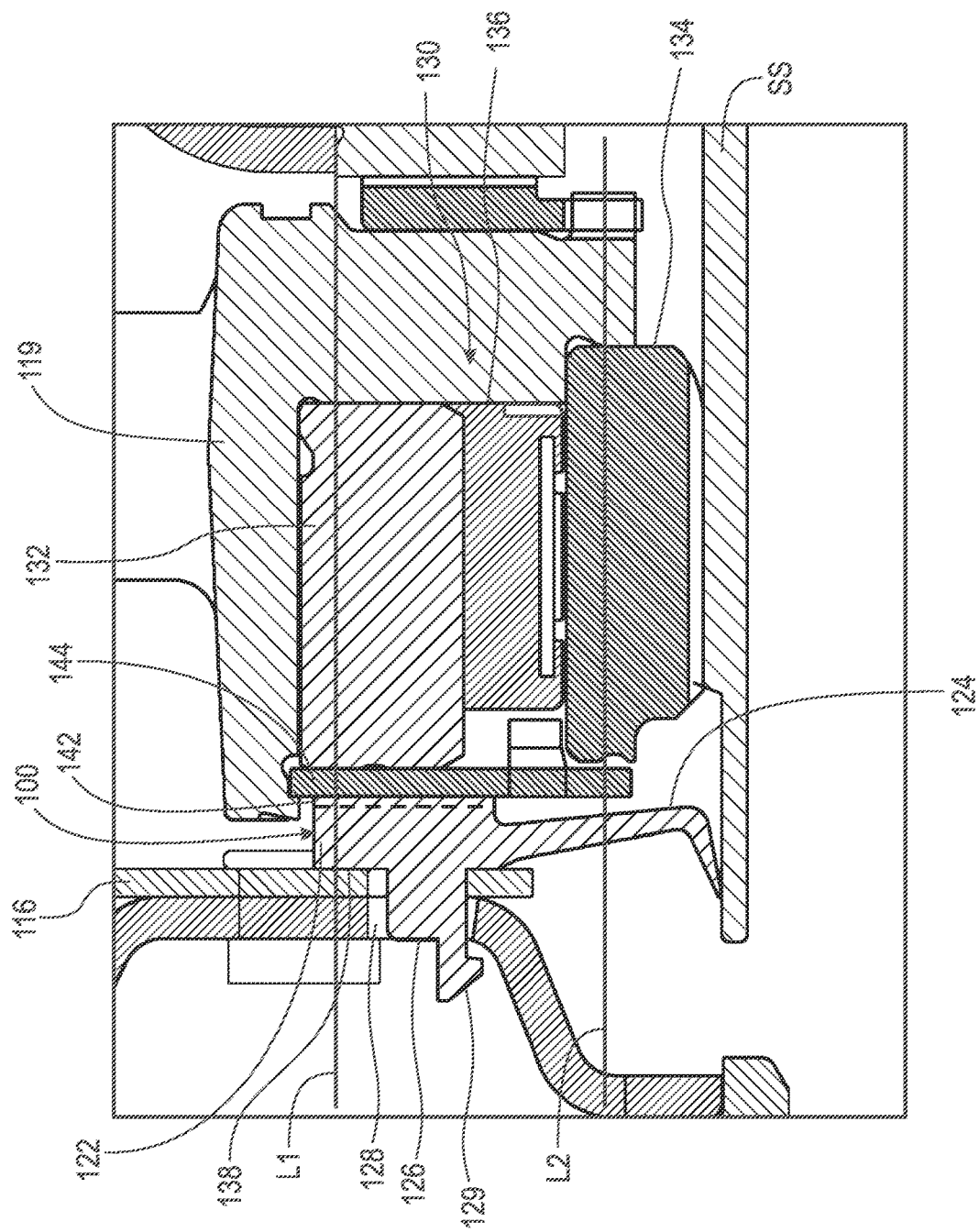
FIG. 2 is a detail of area 2 in FIG. 1.

FIG. 2 is a detail of area 2 in FIG. 1. The following should be viewed in light of FIGS. 1 and 2. Torque converter 102 includes: cover 104; impeller 106; turbine 108; and stator assembly 110 including combination washer and seal 100. Cover 104 is arranged to receive rotational torque. Impeller 106 includes: impeller shell 112 non-rotatably connected to cover 104; and at least one impeller blade 114. Turbine 108 is in fluid communication with impeller 106 and includes: turbine shell 116; and at least one turbine blade 118. As further described below, stator assembly 110 is arranged to non-rotatably connect to stator shaft SS (partially shown), and includes stator 119 with at least one stator blade 120 axially disposed between impeller 106 and turbine 108. Combination washer and seal 100 includes: portion 122 axially disposed between turbine shell 116 and stator 119; and portion 124 extending radially inwardly, in radial inner direction RD1 orthogonal to axis of rotation AR of torque converter 102, from portion 122 and arranged to at least partially seal against stator shaft SS. In the example of FIG. 1, combination washer and seal 100 is made of a single piece of material. In the example of FIG. 1, combination washer and seal 100 is made of a resilient material. By "resilient material," we mean a material that can be deflected/bent from a free/unloaded state and that returns to the free state, without permanent deformation, when a force deflecting/bending the material is removed.

By "non-rotatably connected" components, we mean that components are connected so that whenever one of the components rotates, all the components rotate; and relative rotation between the components is precluded. Radial and/or axial movement of non-rotatably connected components with respect to each other is possible. Components connected by tabs, gears, teeth, or splines are considered as non-rotatably connected despite possible lash inherent in the connection. The input and output elements of a closed clutch are considered non-rotatably connected despite possible slip in the clutch. The input and output parts of a vibration damper, engaged with springs for the vibration damper, are not considered non-rotatably connected due to the compression and unwinding of the springs. Without a further modifier, the non-rotatable connection between or among components is assumed for rotation in any direction. However, the non-rotatable connection can be limited by use of a modifier. For example, "non-rotatably connected for rotation in circumferential direction CD1," defines the connection for rotation only in circumferential direction CD1.

Figure 3A:
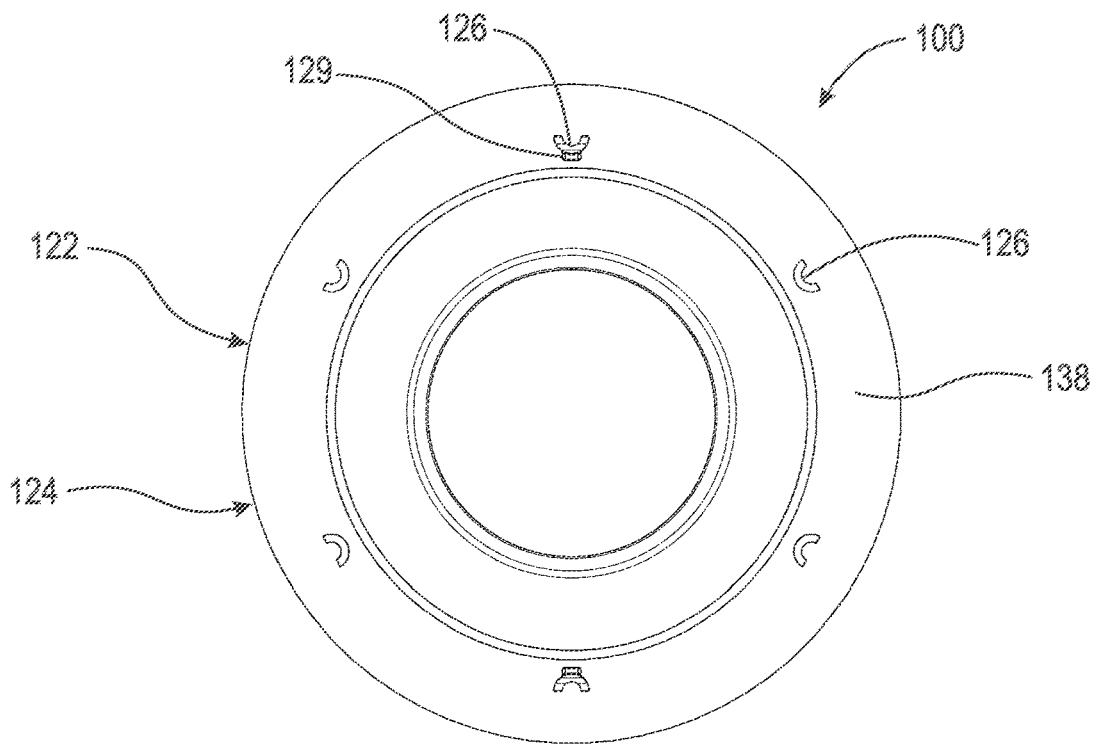
FIG. 3A is a front view of the combination washer and seal shown in FIG. 1.

FIG. 3A is a front view of combination washer and seal 100 shown in FIG. 1.

Figure 3B:
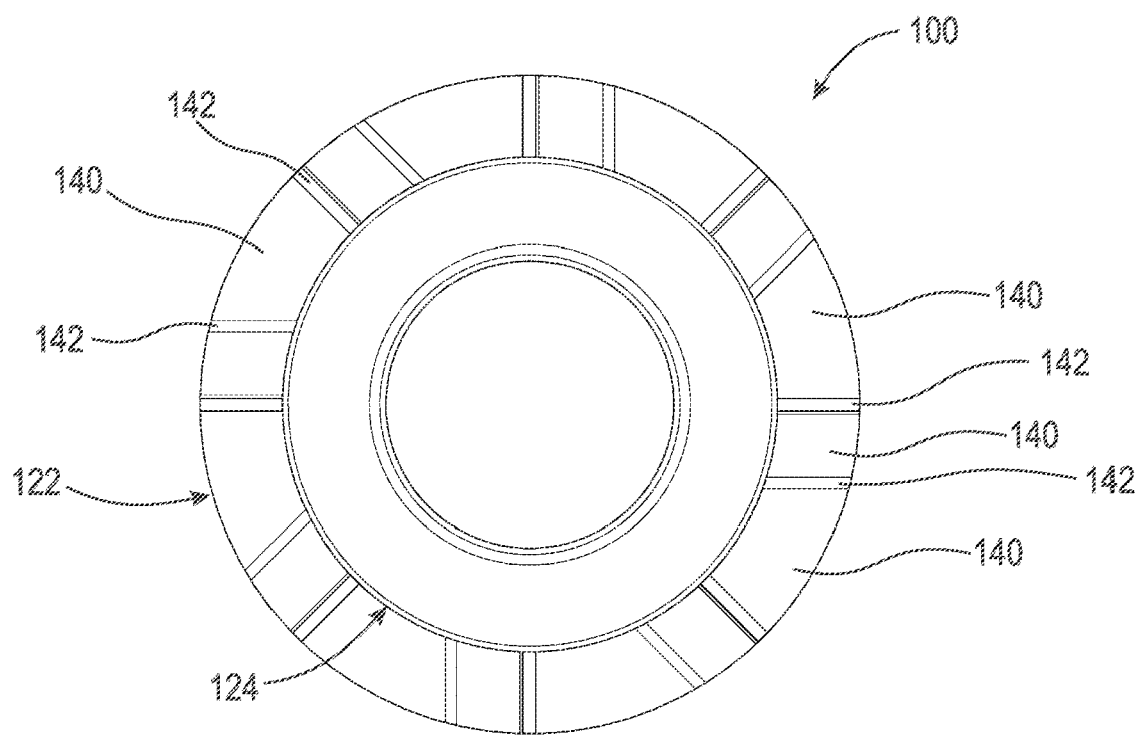
FIG. 3B is a back view of the combination washer and seal shown in FIG. 1.

FIG. 3B is a back view of combination washer and seal 100 shown in FIG. 1. The following should be viewed in light of FIGS. 1 through 3B. In the example of FIG. 1, combination washer and seal 100 is non-rotatably connected to turbine shell 116 by protrusions 126 disposed in openings 128 in turbine shell 116. In the example of FIG. 1, two protrusions 126 also include a prong 129 used to hold combination washer and seal 100 in place during assembly of torque converter 102.

Stator assembly 110 includes one-way clutch 130. Clutch 130 includes: outer race 132; inner race 134 arranged to non-rotatably connect to stator shaft SS; and intermediate elements 136 schematically shown in FIG. 1, disposed between race 132 and race 134, and arranged to control relative rotation between races 132 and 134. In the example of FIG. 1, portion 124 extends past outer race 132 and inner race 134 in direction RD1. Line L1, parallel to axis of rotation AR, passes through portion 122 and outer race 132. Line L2, parallel to axis of rotation AR, passes through portion 124 and inner race 134. Intermediate elements 136 can be any elements known in the art, including but not limited to rollers and sprags.

Portion 122 of combination washer and seal 100 includes surface 138 facing in axial direction AD1 parallel to axis AR. In the example of FIG. 1, portion 122 of combination washer and seal 100 includes surface segments 140 facing in axial direction AD2, opposite direction AD1. Segments 140 define radially and circumferentially oriented grooves 142.

As is known in the art, for a drive mode of torque converter 102, in which a rotational speed of impeller 106 is greater than a rotational speed of turbine 108, hydraulic pressure from pressurized fluid PF in torque converter 102 generates force F urging turbine shell 116 in direction AD2 and clamping portion 122 between turbine shell 116 and stator assembly 110, for example between turbine shell 116 and end plate 144 of stator assembly 110. In the example of FIG. 1, surface 138 is smooth and surface 138 forms a seal against turbine shell 116 in the drive mode. Segments 140 are smooth and seal against end plate 144 of one-way clutch 130. However, grooves 142 enable flow of pressurized fluid PF through combination washer and seal 100 to help cool torque converter 102 during the drive mode.

Figure 4:
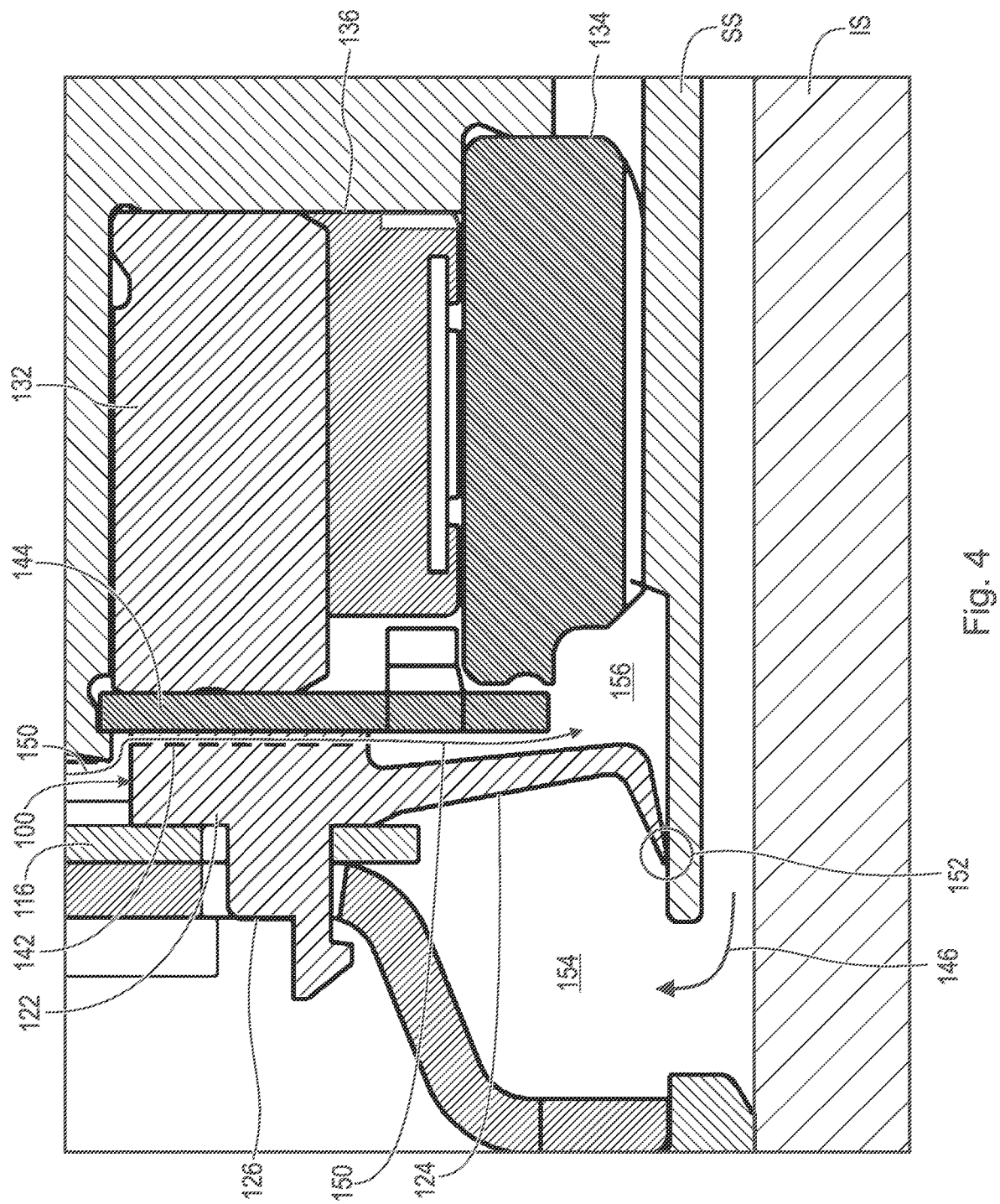
FIG. 4 is a detail of area 4 in FIG. 1, illustrating pressurized fluid flow paths.

FIG. 4 is a detail of area 4 in FIG. 1, illustrating pressurized fluid flow paths. The following should be viewed in light of FIGS. 1 through 4. In FIG. 4, input transmission shaft IS is added to FIG. 1. As is known in the art, pressurized fluid PF is transmitted via flow path 146 through channel CH, formed between stator shaft SS and input shaft IS, into pressure chamber 148 bounded at least in part by cover 104 and turbine shell 116. Fluid path 150 through grooves 142 is a return flow path for pressurized fluid PF, and as noted above, serves as part of the cooling system for torque converter 102. Combination washer and seal 100 separates fluid paths 146 and 150, which enables proper operation of torque converter 102. For example, fluid seal 152 formed by portion 124 and stator shaft SS prevents fluid paths 146 and 150 from mingling. For example: combination washer and seal 100 and turbine shell bound, at least in part, portion 154 of chamber 148 through which flow path 146 passes; and combination washer and seal 100 and stator 110 bound, at least in part, chamber 156 through which flow path 150 passes. Portion 154 and chamber 156 are fluidly isolated from each other by combination washer and seal 100.

In the example of FIG. 1, torque converter 102 includes lock-up clutch 158 and vibration damper 160. It is understood that combination washer and seal 100 is not limited to use with the configuration of torque converter 102 and that combination washer and seal 100 can be used in other torque converter configurations.

Combination washer and seal 100 combines the structure and function of a thrust washer with the structure and function of a seal. Portion 122 is a thrust washer to accommodate force F urging turbine shell 116 in direction AD2. Portion 124 is a seal isolating fluid flow path 146 from fluid flow path 150. Thus, combination washer and seal 100 reduces the cost, complexity, and parts count of torque converter 102.

Figure 5:
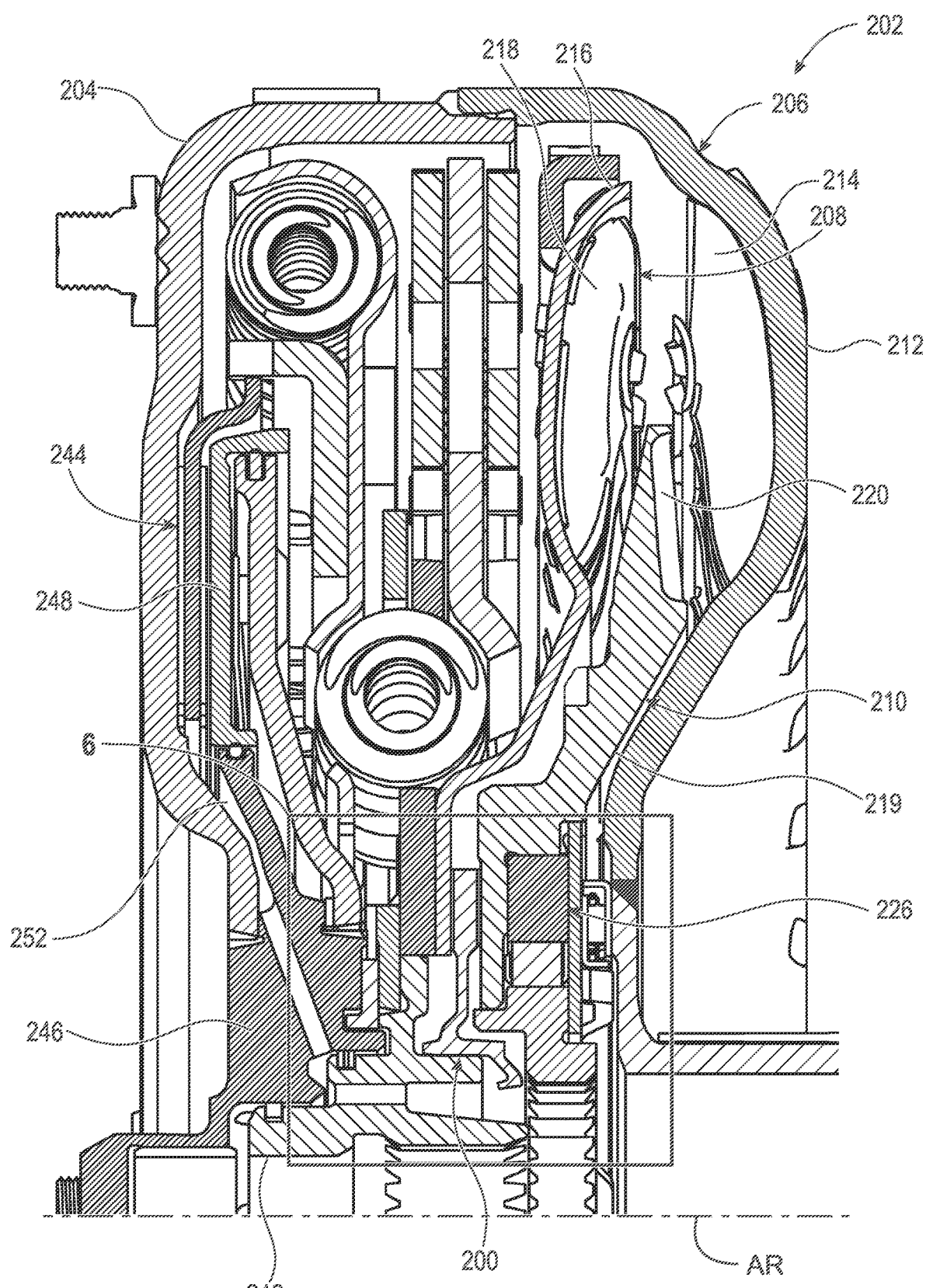
FIG. 5 is a partial cross-sectional view of a torque converter with a combination washer and seal.

FIG. 5 is a partial cross-sectional view of a torque converter with combination washer and seal 200.

Figure 6:
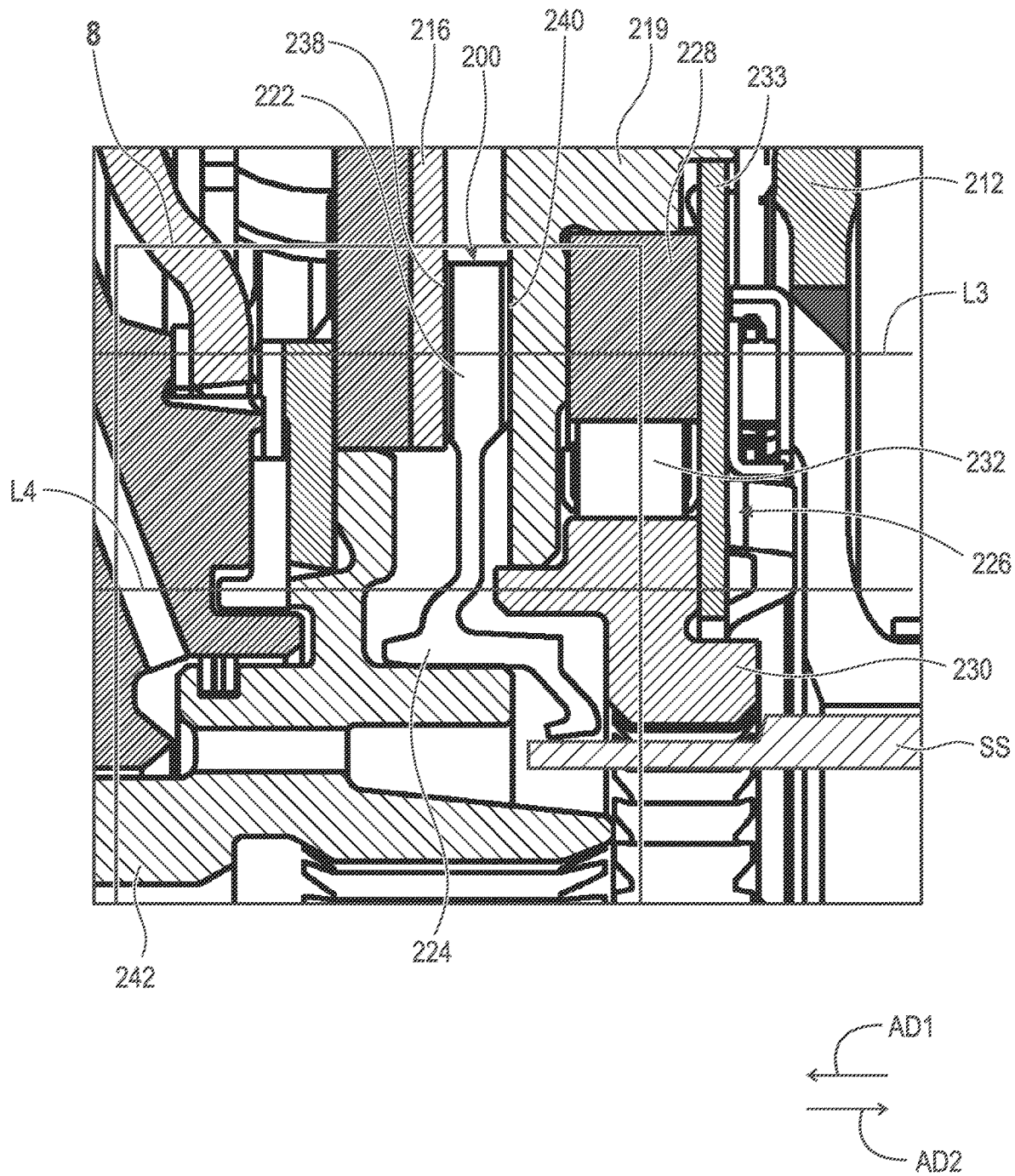
FIG. 6 is a detail of area 6 in FIG. 5.

FIG. 6 is a detail of area 6 in FIG. 5. The following should be viewed in light of FIGS. 5 and 6. Torque converter 202 includes: cover 204; impeller 206; turbine 208; and stator assembly 210 including combination washer and seal 200. Cover 204 is arranged to receive rotational torque. Impeller 206 includes: impeller shell 212 non-rotatably connected to cover 204; and at least one impeller blade 214. Turbine 208 is in fluid communication with impeller 206 and includes: turbine shell 216; and at least one turbine blade 218. As further described below, stator assembly 210 is arranged to non-rotatably connect to stator shaft SS (a portion of which is added to FIG. 6) and includes stator 219 with at least one stator blade 220 axially disposed between impeller 206 and turbine 208. Combination washer and seal 200 includes: portion 222 axially disposed between turbine shell 216 and stator assembly 210; and portion 224 extending radially inwardly, in radial inner direction RD1 from portion 222 and arranged to at least partially seal against stator shaft SS. In the example of FIG. 5, combination washer and seal 200 is made of a single piece of material.

Figure 7A:
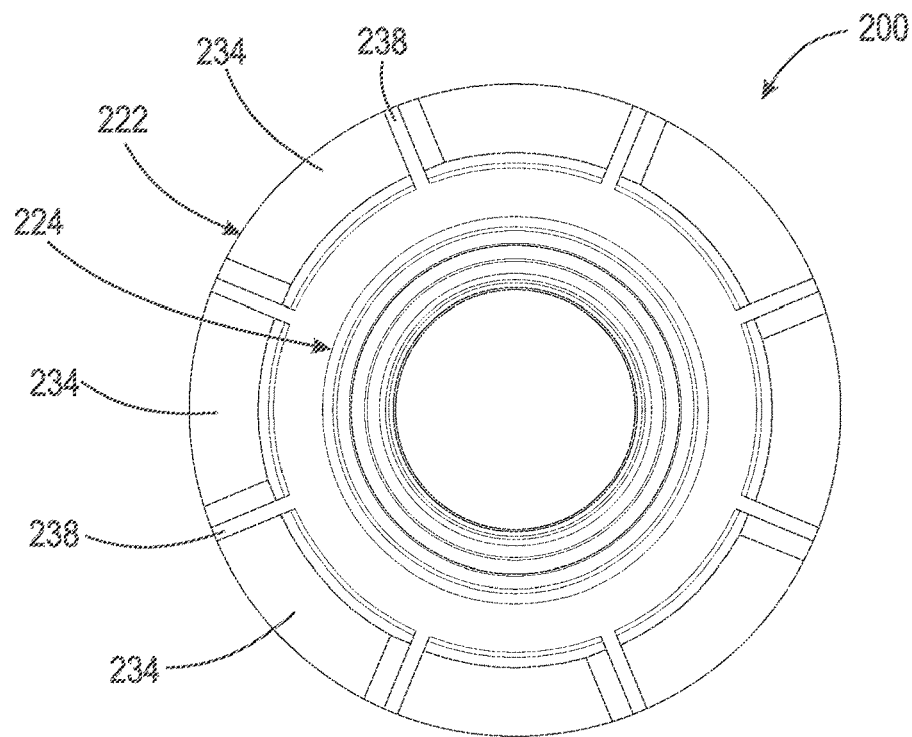
FIG. 7A is a front view of the combination washer and seal shown in FIG. 5.

FIG. 7A is a front view of combination washer and seal 200 shown in FIG. 5.

Figure 7B:
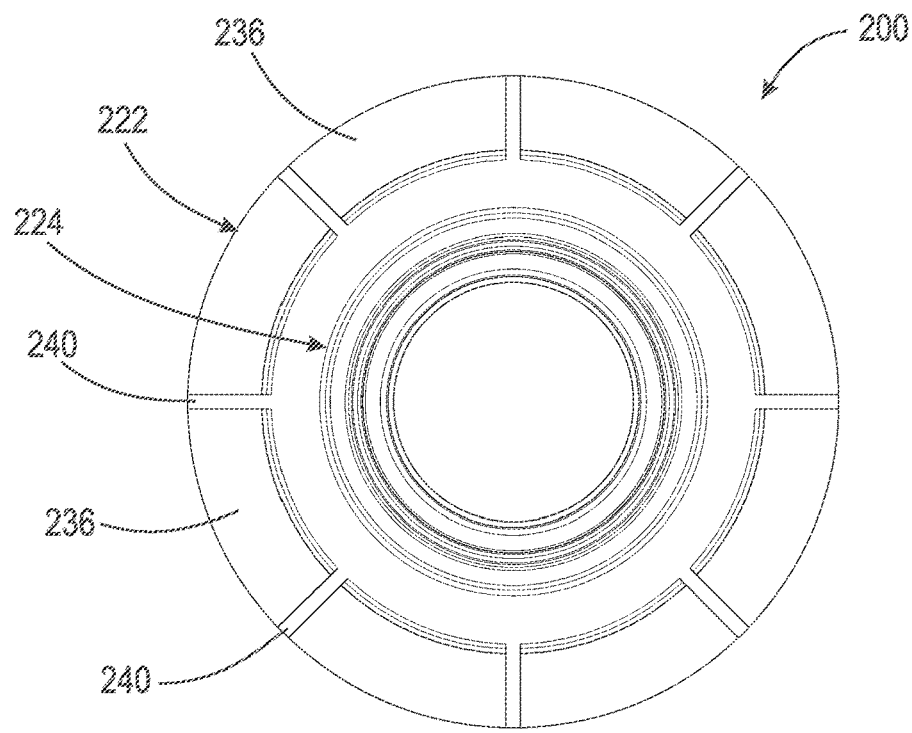
FIG. 7B is a back view of the combination washer and seal shown in FIG. 5.

FIG. 7B is a back view of combination washer and seal 200 shown in FIG. 5. The following should be viewed in light of FIGS. 5 through 7B. In the example of FIG. 5, stator assembly 210 includes one-way clutch 226. Clutch 226 includes: outer race 228; inner race 230 arranged to non-rotatably connect to stator shaft SS; intermediate elements 232 schematically shown in FIG. 5, disposed between race 228 and race 230, and arranged to control relative rotation between races 228 and 230; and end plate 233. Portion 224 extends past outer race 228 in direction RD1. Line L3, parallel to axis of rotation AR, passes through portion 222 and outer race 228. Line L4, parallel to axis of rotation AR, passes through portion 224 and inner race 230. Intermediate elements 232 can be any elements known in the art, including but not limited to rollers and sprags.

In the example of FIG. 5, combination washer and seal 200 includes: surface segments 234 facing in axial direction AD1 parallel to axis AR; and surface segments 236 facing in axial direction AD2, opposite direction AD1. Segments 234 define radially-oriented grooves 238, and segments 236 define radially-oriented grooves 240.

As is known in the art, for a drive mode of torque converter 202, in which a rotational speed of impeller 206 is greater than a rotational speed of turbine 208, hydraulic pressure from pressurized fluid PF in torque converter 202 generates force F urging turbine shell 216 in direction AD2 and clamping portion 222 between turbine shell 216 and stator assembly 210. Under force F, surface segments 234 seal against turbine shell 216 and surface segments 236 seal against stator assembly 210, for example against stator 219. Portion 224 seals against output hub 242 of torque converter 202. In the example of FIG. 5, portion 224 seals output hub 242 regardless of force F.

Figure 8:
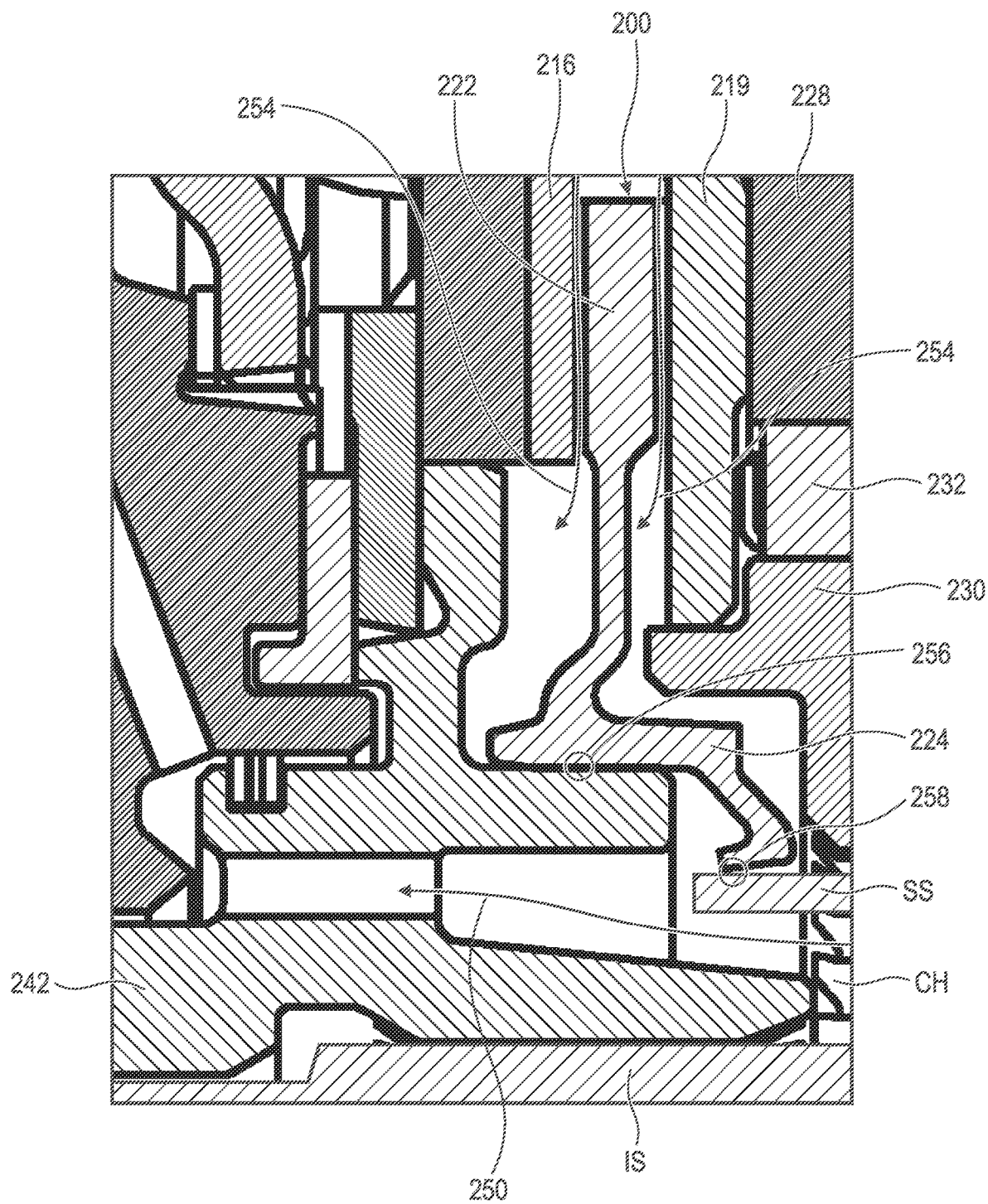
FIG. 8 is a detail of area 8 in FIG. 5, illustrating pressurized fluid flow paths.

FIG. 8 is a detail of area 8 in FIG. 5, illustrating pressurized fluid flow paths. The following should be viewed in light of FIGS. 5 through 8. In FIG. 8, input transmission shaft IS is added. In the example of FIG. 5, torque converter 202 includes lock-up clutch 244 with hub 246 and piston plate 248. Pressurized fluid is transmitted via flow path 250 through channel CH, formed between stator shaft SS and input shaft IS, through hub 246, and into pressure chamber 252 bounded at least in part by cover 204, hub 246, and piston plate 248. Fluid flow paths 254 through grooves 238 and 240 are return flow path for pressurized fluid, and as noted above, serve as part of the cooling system for torque converter 202. Combination washer and seal 200 isolates fluid path 250 from fluid paths 254, which enables proper cooling and operation of torque converter 202. For example, fluid seal 256 formed by portion 224 and output hub 242, and fluid seal 258 formed by portion 224 and stator shaft SS prevent fluid path 250 and fluid paths 254 from mingling.

It is understood that combination washer and seal 200 is not limited to use with the configuration of torque converter 202 and that combination washer and seal 200 can be used in other torque converter configurations.

Combination washer and seal 200 combines the structure and function of a thrust washer with the structure and function of a seal. Portion 222 is a thrust washer to accommodate force F urging turbine shell 216 in direction AD2. Portion 224 is a seal isolating fluid flow path 250 from fluid flow paths 254. Thus, combination washer and seal 200 reduces the cost, complexity, and parts count of torque converter 202.

The following should be viewed in light of FIGS. 1 through 8. The following describes a method of operating a torque converter including a cover, an impeller including an impeller shell, connected to the cover, and at least one impeller blade, a turbine in fluid communication with the impeller and including a turbine shell and at least one turbine blade, a stator assembly including a combination washer and seal, and a stator non-rotatably connected to a stator shaft and including at least one stator blade axially disposed between the turbine and the impeller. Although the method is presented as a sequence of steps for clarity, no order should be inferred from the sequence unless explicitly stated.

A first step applies rotational torque to the cover. A second step rotates, with the cover, the impeller shell at a first speed. A third step rotates, with the impeller, the turbine at a second speed less than the first speed. A fourth step clamps, between the turbine shell and the stator assembly, a first portion of the combination washer and seal. A fifth step rotates the turbine shell with respect to at least a portion of the stator assembly. A sixth step seals a second portion of the combination washer and seal against the stator shaft. A seventh step flows a pressurized fluid into a chamber defined at least in part by the cover and the impeller shell. An eighth step blocks, with the second portion of the combination washer and seal, a flow of the pressurized fluid between the stator shaft and the combination washer and seal.

A tenth step: blocks, with the first portion of the combination washer and seal, a flow, between the turbine shell and the stator, of the pressurized fluid from the chamber; or flows, from the chamber and between the turbine shell and the stator, the pressurized fluid through at least one radially oriented groove in the first portion of the combination washer and seal.

In an example embodiment, an eleventh step: flows, from the chamber and between the turbine shell and the stator, the pressurized fluid through the at least one radially oriented groove in the first portion of the combination washer and seal; and separates, with the second portion of the combination washer and seal, the flow of the pressurized fluid into the chamber defined at least in part by the cover and the impeller shell from the flow of the pressurized fluid from the chamber and between the turbine shell and the stator through the at least one radially oriented groove in the first portion of the combination washer and seal.

It will be appreciated that various of the above-disclosed and other features and functions, or alternatives thereof, may be desirably combined into many other different systems or applications. Various presently unforeseen or unanticipated alternatives, modifications, variations, or improvements therein may be subsequently made by those skilled in the art which are also intended to be encompassed by the following claims.

LIST OF REFERENCE CHARACTERS

AD1 axial direction
AD2 axial direction
AR axis of rotation
CH channel
IS input shaft, transmission
L1 line
L2 line
L3 line
L4 line
RD1 radial inner direction
SS stator shaft
100 combination washer and seal
102 torque converter
104 cover
106 impeller 108 turbine
110 stator assembly
112 impeller shell
114 impeller blade
116 turbine shell
118 turbine blade
119 stator
120 stator blade
122 portion, combination washer and seal
124 portion, combination washer and seal
126 protrusion, combination washer and seal
128 opening, turbine shell
129 prong, combination washer and seal
130 one-way clutch
132 outer race
134 inner race
136 intermediate elements
138 surface, combination washer and seal
140 surface segment, combination washer and seal
142 groove, combination washer and seal
144 end plate, stator
146 fluid path
148 pressure chamber
150 fluid path
152 fluid seal
154 chamber
156 chamber
158 lock-up clutch
160 vibration damper
100 combination washer and seal
202 torque converter
204 cover
206 impeller
208 turbine
210 stator assembly
212 impeller shell
214 impeller blade
216 turbine shell
218 turbine blade
219 stator
220 stator blade
222 portion, combination washer and seal
224 portion, combination washer and seal
226 one-way clutch
228 outer race
230 inner race
232 intermediate element
233 end plate
234 surface segments, combination washer and seal
236 surface segments, combination washer and seal
238 groove, combination washer and seal
240 groove, combination washer and seal
242 output hub
244 lock-up clutch
246 hub
248 piston plate
250 fluid flow path
252 pressure chamber
254 fluid flow path
256 fluid path
258 fluid seal

The invention claimed is:

1. A stator assembly for a torque converter, comprising:
a stator including at least one stator blade; and
a one-way clutch including:
an outer race non-rotatably connected to the stator;
an inner race arranged to non-rotatably connect to a stator shaft;
an intermediate element radially disposed between the outer race and the inner race and arranged to control relative rotation between the inner race and the outer race; and,
a combination washer and seal including:
a first portion arranged to be axially disposed between and directly contacting both the stator and a turbine shell of the torque converter; and,
a second portion extending radially inwardly from the first portion and arranged to at least partially seal against the stator shaft.

2. The torque converter of claim 1, wherein the combination washer and seal is non-rotatably connected to the turbine shell.

3. The torque converter of claim 1, wherein a straight line, parallel to an axis of rotation of the stator assembly, passes through the outer race and the first portion of the combination washer and seal.

4. The torque converter of claim 1, wherein a straight line, parallel to an axis of rotation of the stator assembly, passes through the inner race and the second portion of the combination washer and seal.

5. The torque converter of claim 1, wherein the combination washer and seal is formed of a single piece of material.

6. The torque converter of claim 1, wherein the second portion is free of a through-bore passing through the second portion.

7. A torque converter, comprising:
a cover arranged to receive torque;
an impeller including:
an impeller shell connected to the cover; and,
at least one impeller blade;
a turbine in fluid communication with the impeller and including:
a turbine shell; and,
at least one turbine blade; and,
a stator assembly including:
a stator including at least one stator blade axially disposed between the turbine and the impeller;
a one-way clutch including:
an outer race non-rotatably connected to the stator; and,
an inner race arranged to non-rotatably connect to a stator shaft; and,
a combination washer and seal including:
a first portion axially disposed between the turbine shell and the stator, the first portion including a plurality of surface segments defining a plurality of radially-oriented grooves; and,
a second portion extending radially inwardly from the first portion and arranged to at least partially seal against the stator shaft.

8. The torque converter of claim 7, wherein when the impeller rotates faster than the turbine, hydraulic pressure in the torque converter is arranged to clamp the first portion of the combination washer and seal between the turbine shell and the stator.

9. The torque converter of claim 7, wherein:
when the impeller rotates faster than the turbine:
hydraulic pressure in the torque converter is arranged to seal the first portion against the turbine shell and to seal the plurality of surface segments against the stator; and, a pressurized fluid is arranged to flow from a chamber, defined at least in part by the cover and the impeller shell, through the plurality of radially-oriented grooves.

10. The torque converter of claim 7, wherein the combination washer and seal is non-rotatably connected to the turbine shell.

11. The torque converter of claim 7, wherein a straight line, parallel to an axis of rotation of the torque converter, passes through the outer race and the first portion of the combination washer and seal.

12. The torque converter of claim 7, wherein a straight line, parallel to an axis of rotation of the torque converter, passes through the inner race and the second portion of the combination washer and seal.

13. The torque converter of claim 7, wherein the combination washer and seal is formed of a single piece of material.

14. The torque converter of claim 7, wherein the combination washer and seal is formed of a single piece of resilient material that can be deflected from an unloaded state and return to the unloaded state, without permanent deformation, when a force deflecting the material is removed.

15. The torque converter of claim 7, wherein the second portion of the combination washer and seal is arranged to block a flow of pressurized fluid between the combination washer and seal and the stator shaft.

16. The torque converter of claim 7, wherein the second portion is free of a through-bore passing through the second portion.

17. The torque converter of claim 7, further comprising:
an output hub arranged to receive rotational torque from the turbine shell and to non-rotatably connect to an input shaft of a transmission, wherein the second portion of the combination washer and seal is in contact with the output hub.

18. A method of operating a torque converter including a cover, an impeller including an impeller shell, connected to the cover, and at least one impeller blade, a turbine in fluid communication with the impeller and including a turbine shell and at least one turbine blade, a stator assembly including a combination washer and seal, and a stator non-rotatably connected to a stator shaft and including at least one stator blade axially disposed between the turbine and the impeller, the method comprising:
applying rotational torque to the cover;
rotating, with the cover, the impeller shell at a first speed;
rotating, with the impeller, the turbine at a second speed less than the first speed;
clamping, between the turbine shell and the stator assembly, a first portion of the combination washer and seal;
rotating the turbine shell with respect to at least a portion of the stator assembly;
sealing a second portion of the combination washer and seal directly against the stator shaft;
flowing a pressurized fluid into a chamber defined at least in part by the cover and the impeller shell; and,
blocking, with the second portion of the combination washer and seal, a flow of the pressurized fluid between the stator shaft and the combination washer and seal.

19. The method of claim 18 further comprising:
blocking, with the first portion of the combination washer and seal, a flow, between the turbine shell and the stator, of the pressurized fluid from the chamber;
or, flowing, from the chamber and between the turbine shell and the stator, the pressurized fluid through at least one radially oriented groove in the first portion of the combination washer and seal.

20. The method of claim 19 further comprising:
flowing, from the chamber and between the turbine shell and the stator, the pressurized fluid through the at least one radially oriented groove in the first portion of the combination washer and seal; and,
separating, with the second portion of the combination washer and seal, the flow of the pressurized fluid into the chamber defined at least in part by the cover and the impeller shell from the flow of the pressurized fluid from the chamber and between the turbine shell and the stator through the at least one radially oriented groove in the first portion of the combination washer and seal.

* * * * *